(12) United States Patent
Holo

(10) Patent No.: US 8,391,102 B2
(45) Date of Patent: Mar. 5, 2013

(54) AUTOMATIC SYSTEMS AND METHODS FOR POSITIONING MARINE SEISMIC EQUIPMENT

(75) Inventor: Andreas Thiblin Holo, Hosle (NO)

(73) Assignee: WesternGeco L.L.C., Houston, TX (US)

( * ) Notice: Subject to any disclaimer, the term of this patent is extended or adjusted under 35 U.S.C. 154(b) by 1291 days.

(21) Appl. No.: 11/213,246

(22) Filed: Aug. 26, 2005

(65) Prior Publication Data

US 2007/0064526 A1 Mar. 22, 2007

(51) Int. Cl.
*G01V 1/38* (2006.01)

(52) U.S. Cl. ............................... 367/19; 367/16; 367/17

(58) Field of Classification Search .............. 367/15–19, 367/20

See application file for complete search history.

(56) References Cited

U.S. PATENT DOCUMENTS

| | | | |
|---|---|---|---|
| 3,560,912 A | 2/1971 | Spink et al. | |
| 3,605,674 A | 9/1971 | Weese | |
| 3,774,570 A | 11/1973 | Pearson | |
| 4,404,664 A | 9/1983 | Zachariadis | |
| 4,460,185 A * | 7/1984 | Grandey | 277/415 |
| 4,890,568 A * | 1/1990 | Dolengowski | 114/246 |
| 5,443,027 A | 8/1995 | Owsley et al. | |
| 5,650,981 A * | 7/1997 | Jacobsen et al. | 367/19 |
| 5,790,472 A * | 8/1998 | Workman et al. | 357/19 |
| 6,028,817 A * | 2/2000 | Ambs | 367/16 |
| 6,091,670 A | 7/2000 | Oliver et al. | |
| 6,285,956 B1 * | 9/2001 | Bennett et al. | 702/14 |
| 6,525,992 B1 | 2/2003 | Olivier et al. | |
| 6,590,831 B1 | 7/2003 | Bennett et al. | |
| 6,671,223 B2 | 12/2003 | Bittleston | |
| 6,681,710 B2 * | 1/2004 | Semb | 114/244 |
| 6,691,038 B2 * | 2/2004 | Zajac | 367/20 |
| 6,932,017 B1 * | 8/2005 | Hillesund et al. | 114/244 |
| 7,047,898 B2 * | 5/2006 | Petersen et al. | 114/244 |
| 2005/0180263 A1 | 8/2005 | Lambert et al. | |

FOREIGN PATENT DOCUMENTS

| | | |
|---|---|---|
| EP | 0 613 025 | 2/1994 |
| GB | 2 413 849 | 11/2005 |
| SU | 1376052 | 2/1988 |
| WO | WO 84/03153 | 8/1984 |
| WO | WO 01/33256 | 5/2001 |
| WO | WO 2002/103393 | 12/2002 |
| WO | WO 03100451 A2 | 12/2003 |
| WO | WO 2005096018 A1 | 10/2005 |

OTHER PUBLICATIONS

Qin and Badgwell, "An Overview of Industrial Model Predictive Control Technology," URL: www.che.utexas.edu/~qin/cpcv/cpcv14.html. UK Search Report dated Dec. 1, 2006 for Application No. GB 0615795.2.

* cited by examiner

*Primary Examiner* — Isam Alsomiri
*Assistant Examiner* — Daniel L Murphy (57) ABSTRACT

Systems and methods for automatic steering of marine seismic towing vessels are described. One system comprises a towing vessel, a seismic source, and optionally one or more seismic streamers towed by the towing vessel; a steering sub-system for steering the vessel, the sub-system including a vessel steering algorithm for calculating an optimum vessel steering path; and a controller to produce a difference between a measured position of a tracking point with a pre-plot position of the tracking point, and calculate a set point based on the difference to the steering algorithm. It is emphasized that this abstract is provided to comply with the rules requiring an abstract, allowing a searcher or other reader to quickly ascertain the subject matter of the technical disclosure. It is submitted with the understanding that it will not be used to interpret or limit the scope or meaning of the claims. 37 CFR 1.72(b).

18 Claims, 4 Drawing Sheets

AUTOMATIC SYSTEMS AND METHODS FOR POSITIONING MARINE SEISMIC EQUIPMENT

BACKGROUND OF THE INVENTION

1. Field of Invention

The present invention relates to the field of marine seismic data acquisition systems and methods of using same. More specifically, the invention relates to automatic systems and methods for positioning of a marine seismic source, or other point between a streamer front end and the source, using an automatic controller to steer the towing vessel.

2. Related Art

The performance of a marine seismic acquisition survey typically involves one or more vessels towing at least one seismic streamer through a body of water believed to overlie one or more hydrocarbon-bearing formations. In order to perform a 3-D marine seismic acquisition survey, an array of marine seismic streamers, each typically several thousand meters long and containing a large number of hydrophones and associated electronic equipment distributed along its length, is towed at about 5 knots behind a seismic survey vessel. The vessel also tows one or more seismic sources suitable for use in water, typically air guns. Acoustic signals, or "shots," produced by the seismic sources are directed down through the water into the earth beneath, where they are reflected from the various strata. The reflected signals are received by the hydrophones, or receivers, carried in the streamers, digitized, and then transmitted to the seismic survey vessel where the digitized signals are recorded and at least partially processed with the ultimate aim of building up a representation of the earth strata in the area being surveyed. Often two or more sets of seismic data signals are obtained from the same subsurface area. These sets of seismic data signals may be obtained, for instance, by conducting two or more seismic surveys over the same subsurface area at different times, typically with time lapses between the seismic surveys varying between a few months and a few years. In some cases, the seismic data signals will be acquired to monitor changes in subsurface reservoirs caused by the production of hydrocarbons. The acquisition and processing of time-lapsed three dimensional seismic data signals over a particular subsurface area (commonly referred to in the industry as "4-D" seismic data) has emerged in the last decade or so as an important new seismic prospecting methodology. When conducting repeated surveys, ideally one wants to repeat all source and receiver positions from the base or previous survey. In practice, this is hard to achieve for the entire survey area due to the different environmental conditions encountered in different surveys. Varying currents, both spatially and in time, are the main environmental contributor.

When conducting surveys today, a reference point at the vessel is steered automatically to be at a certain cross line distance from a given pre-plot track. A PID controller, such as that known under the trade designation Robtrack/STS500, may be used for this, and it controls the autopilot mechanism to achieve its goal. The operator sets manually how far the vessel is to be cross-line from the pre-plot line. However, this gives only control of the vessel position, and the sources and streamers will be set off to one side or the other, depending on the environmental effects in the area. When conducting time lapse surveys, the operator has to watch the source and streamer front end positions together with measurements of currents and wind to get an indication of how much the vessel should be moved to the side to achieve the steering objective. Especially when subject to rapidly varying currents, this manual steering is a real challenge, and it is often difficult to position the sources and streamer front ends to be within the specifications all the time. Manual interaction like this is also a slow process with a low update rate that is prone to inducing oscillations. Small deviations may not be reacted upon which might lead to too slow reaction when the current situation is changing. How good the steering will be also depends on the operator, meaning his skill level and level of alertness.

While there have been some efforts to use information regarding environmental conditions, including ocean currents, in vessel steering, previous attempts have not provided the desired precision in positioning marine seismic spread elements.

SUMMARY OF THE INVENTION

In accordance with the present invention, systems and methods are described for positioning a center of a marine seismic source, a streamer front end center, and/or an imaginary tracking point located somewhere in a marine seismic spread, such as between the center of source and streamer front end center, using automatic control of vessel steering. The systems and methods of the invention may also be useful in laying seabed seismic receiver cables.

A first aspect of the invention are systems comprising:
(a) a marine seismic spread comprising a towing vessel and a seismic source, and optionally one or more seismic streamers towed by the towing vessel;
(b) a vessel steering sub-system, the sub-system including a vessel steering algorithm; and
(c) a controller adapted to produce a residual comprising a difference between a measured 3D coordinate position of a tracking point with a pre-plot 3D coordinate position of the tracking point, and input a set point based on the residual to the steering algorithm.

Systems of the invention include those wherein the tracking point may be anywhere in the marine seismic spread, for example but not limited to the center of source, the streamer front end center, streamer back end center, a tracking point somewhere between the center of source and the streamer front end center, a center of a plurality of streamers, a front of any one streamer, and the like. The tracking point may be dynamically or non-dynamically moved within a spread to optimize a given steering strategy. The controller may be physically a part of the vessel steering sub-system or located separately from the steering sub-system, and may use some or all available information, including, but not limited to, source and vessel positions, vessel gyroscope reading, vessel compass reading, vessel speed log, streamer front end positions (if streamers are present), and historical, real-time, and future current and wind information and predictions when calculating the residual difference, and thus these may taken into consideration in the calculation of optimum vessel steering path by the vessel steering sub-system. The phrase "vessel steering sub-system" is defined herein and may differ among the various embodiments of the invention, as explained in the definition. The controller may be selected from PI controllers, PID controllers (including any known or reasonably foreseeable variations of these), and computes a residual equal to a difference between a tracking point 3D coordinate position and a pre-plot track, optionally together with current and wind measurements, to produce a set point input to the vessel steering algorithm used by the vessel steering sub-system. The controller may compute the residual continuously or non-continuously. Other possible implementations of the invention are those wherein the controller comprises more specialized control strategies, such as strategies selected from feed forward, cascade control, internal feedback loops, model predictive control, neural networks, and Kalman filtering techniques. Systems and methods of the invention may be used during seismic data collection, including 3-D and 4-D seismic surveying.

Systems of the invention may include a seismic spread comprising one or more vessels such as towing vessels, a chase vessel, a work vessel, one or more a seismic sources, and optionally one or more seismic streamers towed by towing vessels. The streamers and sources may be separately towed or towed by the same vessel. If towed by separate vessels, two controllers may be employed and two residuals computed. In general, the controller may compute the residual based on what the position measurement system reports as the 3D coordinate position of the tracking point. Although there may be some degree of error in the reported 3D coordinate position due to a variety of error sources, including instrument measurement error, even with the errors the tracking point may be better controlled by steering the vessel the majority of the time.

Systems and methods of the invention may optionally be used in conjunction with other systems and methods. For example, if the center of source is the tracking point, its 3D coordinate position may be determined from acoustic ranging networks, GPS, and other position sensors, and since the seismic team knows the path the tracking point is supposed to follow based on the survey specifications, the controller may use at least that information to calculate a residual, and a set point based on the residual, for the steering algorithm, either to steer the vessel back to the survey-specified path, or ensure that the survey-specified path is adhered to.

Another aspect of the invention comprises methods of automatically controlling position of a tracking point, comprising:
  (a) measuring a position of a tracking point in a marine seismic spread;
  (b) computing a residual difference between the measured position and a pre-plot position of the tracking point; and
  (c) steering a marine seismic tow vessel using a set point based on the residual difference in a steering algorithm of a vessel steering sub-system, the vessel towing a marine seismic source and optionally one or more marine seismic streamers.

Methods of the invention include those wherein the computing includes use of a PI or PID controller alone or in conjunction with other controllers, and may comprise towing a seismic spread comprising a towing vessel, a seismic source, and one or more seismic streamers, which may be towed in side-by-side configuration, over/under configuration, "V" configuration, "W" configuration, or some other configuration.

Systems and methods of the invention will become more apparent upon review of the brief description of the drawings, the detailed description, and the claims that follow.

BRIEF DESCRIPTION OF THE DRAWINGS

The manner in which the objectives of the invention and other desirable characteristics can be obtained is explained in the following description and attached drawings in which.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible. For example, in the discussion herein, aspects of the invention are developed within the general context of controlled positioning of seismic spread elements, which may employ computer-executable instructions, such as program modules, being executed by one or more conventional computers. Generally, program modules include routines, programs, objects, components, data structures, etc. that perform particular tasks or implement particular abstract data types. Moreover, those skilled in the art will appreciate that the invention may be practiced in whole or in part with other computer system configurations, including hand-held devices, personal digital assistants, multiprocessor systems, microprocessor-based or programmable electronics, network PCs, minicomputers, mainframe computers, and the like. In a distributed computer environment, program modules may be located in both local and remote memory storage devices. It is noted, however, that modification to the systems and methods described herein may well be made without deviating from the scope of the present invention. Moreover, although developed within the context of automatically controlling position of a tracking point by steering a vessel, those skilled in the art will appreciate, from the discussion to follow, that the principles of the invention may well be applied to other aspects of seismic data acquisition. Thus, the systems and method described below are but illustrative implementations of a broader inventive concept.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The present invention relates to various systems and methods for controlling position of a tracking point in a marine seismic spread primarily by steering the vessel which tows the spread. One aspect of the present invention relates to systems including a vessel-steering sub-system whose set point is computed by a controller receiving 3D coordinate position information concerning the center of the seismic source, the streamer front center, or an imaginary tracking point. Another aspect of the invention comprises methods of using a system of the invention to control the tracking of seismic sources and streamers.

The phrase "center of source", sometimes referred to herein as CS, means the 3D coordinate position of the center of a plurality of air-guns or other acoustic devices designed to produce acoustic signals, or "shots," which are directed down through the water into the earth beneath, where they are reflected from the various strata.

The phrase "streamer front end center", sometimes referred to herein as SFC, means the 3D coordinate position of a plurality of streamer front ends determined from the individual 3D coordinate positions of each streamer front end, that is, the streamer ends closest to the towing vessel.

The phrase "vessel steering sub-system" means any device or collection of components that are capable of generating commands to vessel steering elements, such as rudders, thrusters, and the like, to accomplish the intended movements of the seismic towing vessel. In some embodiments of the invention the vessel steering sub-system may include a vessel tracking computer and/or an autopilot. In other embodiments of the invention a vessel steering sub-system may bypass conventional tracking and autopilot functions, and may be simply a vessel rudder controller, and/or a vessel thruster controller (these embodiments may be referred to as "steering the vessel directly" using the controller of the invention). In yet other embodiments of the invention, all of these components (tracking computer, autopilot, rudder controller, and thruster controllers) may be employed.

The term "spread" and the phrase "seismic spread" are used interchangeably herein and mean the total number of components, including vessels, vehicles, and towed objects including cables, sources and receivers, that are used together to conduct a marine seismic data acquisition survey.

The term "control", used as a transitive verb, means to verify or regulate by comparing with a standard or desired value. Control may be closed loop, feedback, feed-forward, cascade, model predictive, adaptive, heuristic and combinations thereof.

The term "controller" means a device at least capable of accepting input from sensors and meters in real time or near-real time, and sending commands directly to a vessel steering sub-system, and optionally to spread control elements, and/or to local devices associated with spread control elements able to accept commands. A controller may also be capable of accepting input from human operators; accessing databases, such as relational databases; sending data to and accessing data in databases, data warehouses or data marts; and sending information to and accepting input from a display device readable by a human. A controller may also interface with or have integrated therewith one or more software application modules, and may supervise interaction between databases and one or more software application modules.

The phrase "PID controller" means a controller using proportional, integral, and derivative features, as further explained herein. In some cases the derivative mode may not be used or its influence reduced significantly so that the controller may be deemed a PI controller. It will also be recognized by those of skill in the control art that there are existing variations of PI and PID controllers, depending on how the discretization is performed. These known and foreseeable variations of PI, PID and other controllers are considered within the invention.

The phrase "spread control element" means a spread component that is controllable and is capable of causing a spread component to change coordinates, either vertically, horizontally, or both, and may or may not be remotely controlled.

The terms "control position", "position controllable", "remotely controlling position" and "steering" are generally used interchangeably herein, although it will be recognized by those of skill in the art that "steering" usually refers to following a defined path, while "control position", "position controllable", and "remotely controlling position" could mean steering, but also could mean merely maintaining position. In the context of the present invention, "control position" means we use at least the tracking point position and compare it to a pre-plot path in order to give steering commands to vessel steering elements.

"Real-time" means dataflow that occurs without any delay added beyond the minimum required for generation of the dataflow components. It implies that there is no major gap between the storage of information in the dataflow and the retrieval of that information. There may be a further requirement that the dataflow components are generated sufficiently rapidly to allow control decisions using them to be made sufficiently early to be effective. "Near-real-time" means dataflow that has been delayed in some way, such as to allow the calculation of results using symmetrical filters. Typically, decisions made with this type of dataflow are for the enhancement of real-time decisions. Both real-time and near-real-time dataflows are used immediately after the next process in the decision line receives them.

The term "position", when used as a noun, is broader than "depth" or lateral (horizontal) movement alone, and is intended to be synonymous with "spatial relation." Thus "vertical position" includes depth, but also distance from the seabed or distance above or below a submerged or semi-submerged object, or an object having portions submerged. When used as a verb, "position" means cause to be in a desired place, state, or spatial relation. The term may also include orientation, such as rotational orientation, pitch, yaw, and the like.

As previously discussed herein, when conducting time-lapse and other marine seismic surveys using towed streamers and sources, the operator typically must watch both the source and streamer front end positions, as well as available measurements of currents and wind to get an indication of how much the vessel should be moved to the side to achieve the steering objective. Especially when subject to rapidly varying currents, this manual steering is a real challenge, and it is often difficult to position the sources and streamer front ends to be within the specifications all the time. Manual interaction requires the dedicated attention of an operator that is typically not available in today's seismic instrument room. Thus the missing attention to the steering task results in a slow process with a low update rate that is prone to inducing oscillations. Small deviations may not be reacted upon which might lead to too slow reaction when the current situation is changing. The steering quality will depend on the operator skill level and attention time available.

Figure 1:
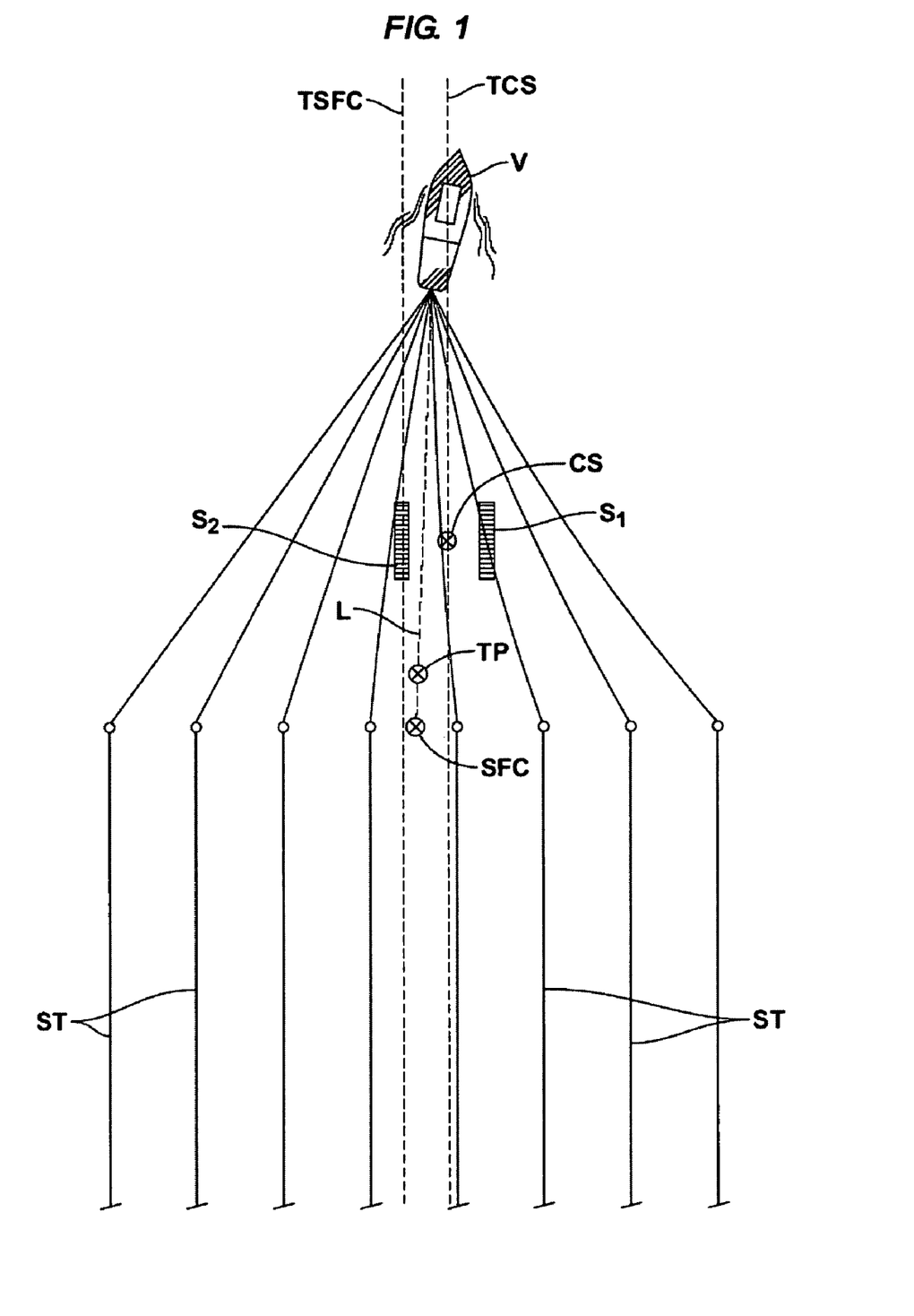
FIG. 1 is a plan or overhead view of a system of the invention.

FIG. 1 illustrates a system and method of the invention and the problems addressed by the inventive systems and methods. Illustrated in schematic plan view is a vessel V pulling two sources $S_1$ and $S_2$, as well as eight streamers ST. Those knowledgeable in the marine seismic industry will recognize many variations on the number of sources and streamers, configuration of streamers, and so on, and this is only one of many possible foreseeable configurations which may benefit from the teachings of the inventive systems and methods. In the arrangement illustrated, which is but one of a great variety within the invention, some or all seismic streamers ST may be pulled laterally by streamer front end deflectors, not illustrated, which may be of the type known under the trade designation MONOWING™, available from WesternGeco, LLC, Houston, Tex., or other type of streamer deflector. It is understood that sources and seismic streamers are towed at some depth below the water surface. Sources are typically towed at depths ranging from 0 to 10 meters, while seismic streamers may be towed at multiple depths, but are typically at depths ranging from 3 to 50 meters, depending on the survey specifications. Two roughly parallel track lines are identified as TSFC and TCS, wherein the former refers to the track line of the streamer front end center, while the latter refers to the track line of the center of source. The streamer front end center is noted as SFC in FIG. 1, while the center of source is designated CS in FIG. 1. The designation TP refers to the tracking point, which may be anywhere in the spread, but in certain embodiments may be somewhere between the SFC and CS on a line designated L, and may be one of the points whose position is controlled using the systems and methods of the invention as discussed herein.

Prior to the systems and methods of the invention, the operator viewed the source and streamers, and perhaps took into consideration wind and current data, in steering the vessel in an effort to keep the streamers on the TSFC track line and the center of source on the TCS track line in an open-loop fashion. The systems and methods of the invention automate the feedback loop, by introducing an automatic controller that controls vessel position in such a way that the source or the tracking point is on or close to the desired pre-plot line. The pre-plot line might be straight or have certain curvature. The systems and methods of the invention may also utilize measurements of environmental conditions, including but not limited to wind magnitude and direction, and current magnitude and direction. Other options include using a feed-forward technique, where a separate controller may be added that takes these environmental conditions into account and performs a proactive reaction so as to minimize the environmental effect on the steering objective. If other factors are found to impact the steering objective, feed-forward from these factors may also be included. By performing these functions automatically, an optimally tuned PID and optionally a feed forward, or other controller strategy will command an algorithm within the vessel's steering sub-system, which may include an autopilot, a tracking sub-system, or combination thereof, so that deviations from the steering objectives are corrected rapidly and in a stable way.

Figure 2:
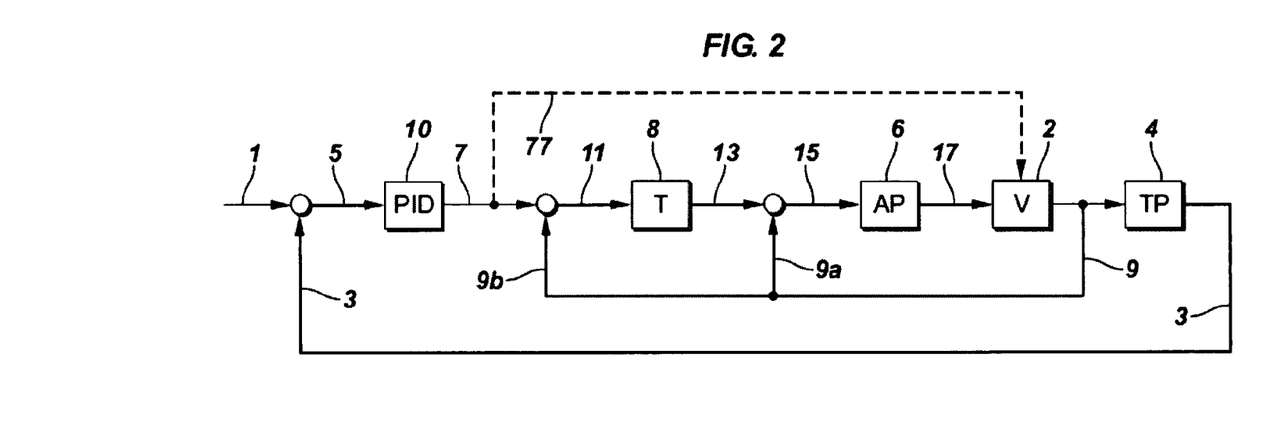
FIGS. 2, 3, 4, 5 and 6 are schematic block diagrams of five embodiments of systems and methods of the invention.

FIGS. 2, 3, 4, 5 and 6 are schematic block diagrams of five non-limiting embodiments of systems and methods of the invention for controlling position of the track point TP using vessel steering. The same numerals are used throughout to designate same components unless otherwise mentioned. FIG. 2 illustrates a simple PID feedback loop. The main components include the vessel 2, a tracking point 4, in a block labeled TP which may be an imaginary point anywhere in the spread, such as between the center of source and streamer front end center, or may be the center of source itself. Also illustrated are blocks 6 for an autopilot AP, a block 8 designating a tracking control device T, and PID controller 10. PID controller 10 compares a set point pre-plot position 1 of tracking point 4 with a measured 3D coordinate position 3 of tracking point 4, and calculates a difference, referred to herein as a residual or residual difference, 5, and generates a command 7 as a set point track to tracking control device 8. It will be understood that certain embodiments will send command 7 directly to the autopilot, bypassing the tracking device, or bypass both the tracking device and autopilot, and directly command the vessel rudder and/or vessel thruster, as indicated by the dashed line 77. In one embodiment of FIG. 2, tracking control device 8 compares this new set point track 7 to a measured track 9b of vessel 2 and computes a difference 11, and uses difference 11 in generating a set point heading 13 for use by autopilot 6. Autopilot 6 compares set point heading 13 with a measured heading 9a of vessel 2, computes a difference as 15, and uses difference 15 to generate a steering set point 17 for vessel 2, which is transmitted to a vessel rudder and/or thruster. Steering of vessel 2 will then influence the tracking point 4 position in a more controlled and stable fashion using a tuned controller, rather than a human operator. In one alternative embodiment, indicated by dashed line 77, steering set point 17 is replaced directly by set point indicated by dashed line 77.

Figure 3:
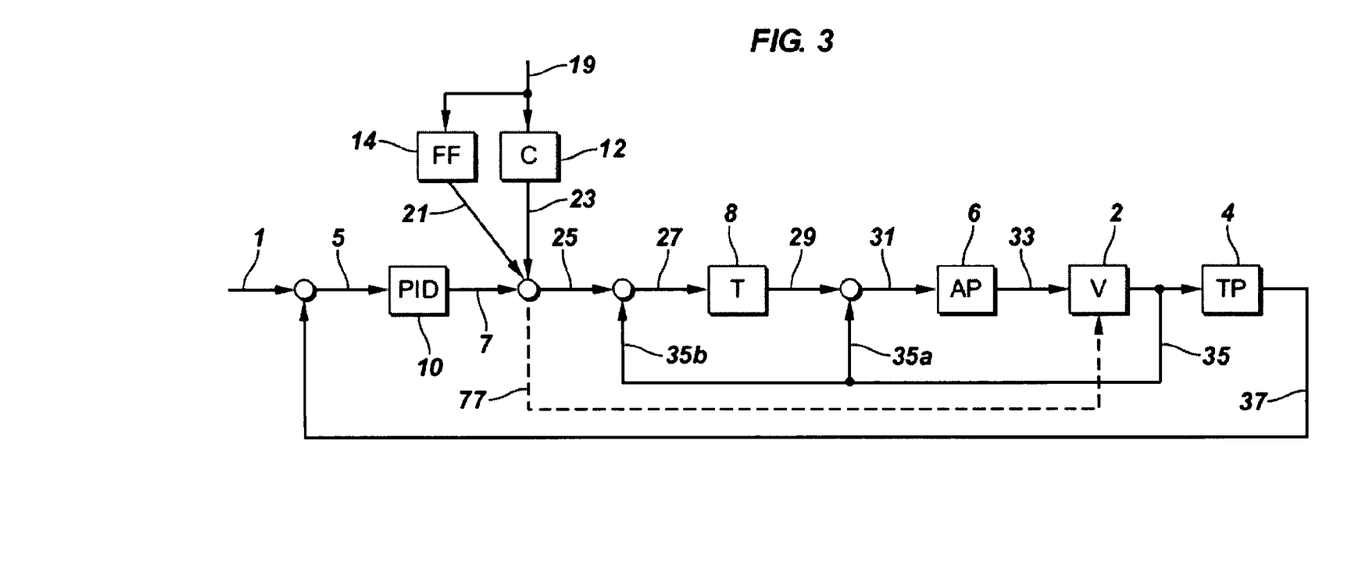

FIG. 3 illustrates a schematic block diagram of another system and method of the invention for controlling position of the track point TP using vessel steering. Components 2, 4, 6, 8, and 10 are the same as in FIG. 2. PID controller 10 compares a pre-plot position 1 of tracking point 4 with a measured 3D coordinate position 37 of tracking point 4, and calculates a difference, referred to herein as a residual or residual difference, 5, and generates a command 7 as a set point track to tracking control device 8. Added in this embodiment is a modification of the set point signal 7 by a feed-forward controller 12 in block C, which may optionally feed historical, real time or near-real time, or future predictions of data 19 regarding current and/or wind as a modification to set point 7. Also depicted is a block denoted FF, which may optionally feed forward historical information 19 regarding wind, current, and other environmental conditions, or information regarding obstructions in the designated survey area, and the like. In one embodiment of FIG. 3, a modified set point track 25 is compared with a measured track 35b of vessel 2 and computes a difference 27, and uses difference 27 in generating a set point heading 29 for use by autopilot 6. Autopilot 6 compares set point heading 29 with a measured heading 35a of vessel 2, computes a difference as 31, and uses difference 31 to generate a steering set point 33 for vessel 2. Alternatively, rather than comparing set point 25 with measured track 35b, set point 77 is sent directly to vessel 2 for changing a vessel rudder, thruster, or both. In either embodiment of FIG. 3, steering of vessel 2 will then influence the tracking point 4 position in a more controlled and stable fashion using a tuned PID controller and feed-forward controller, rather than a PID controller alone, or a human operator.

Figure 4:
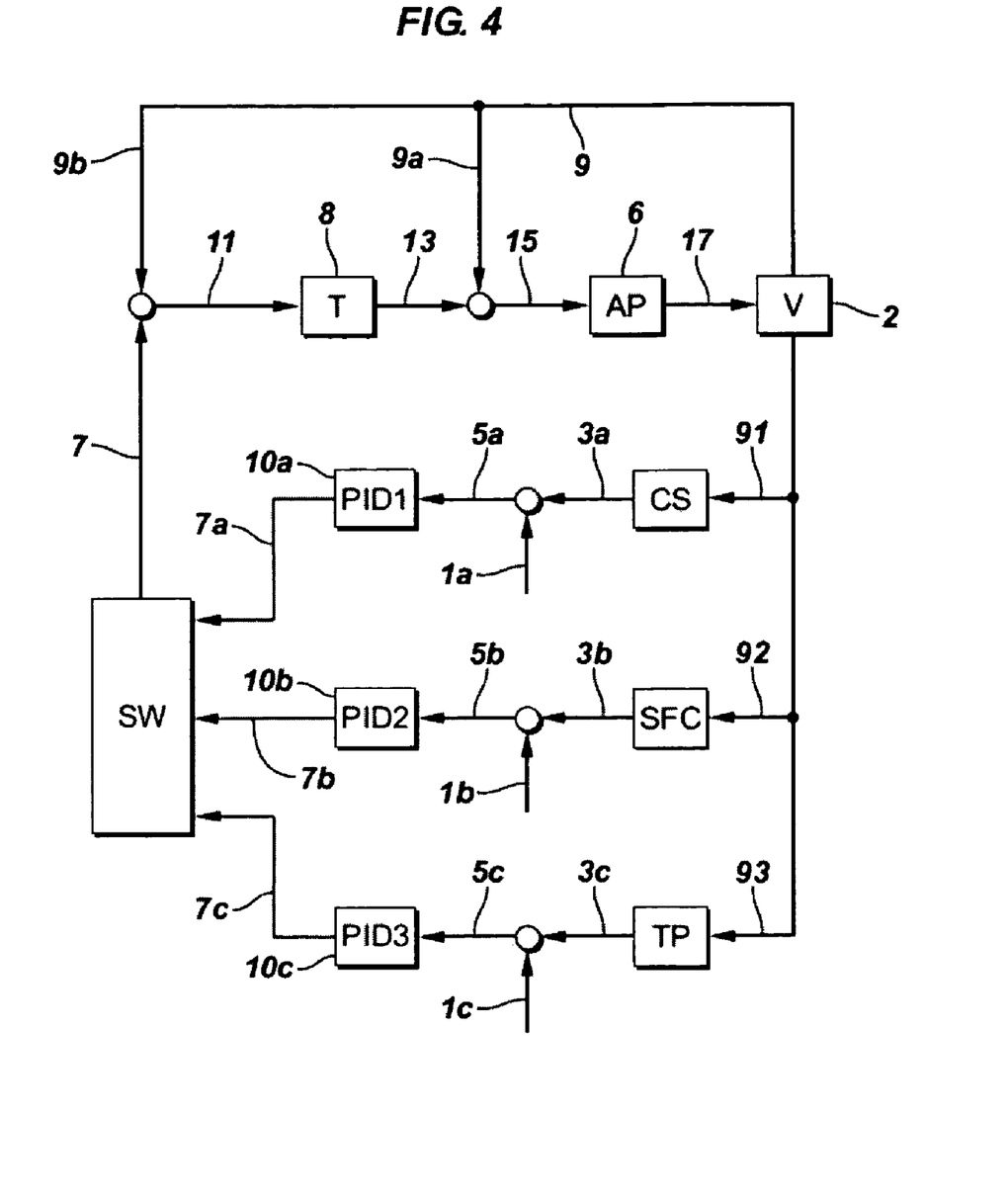

FIG. 4 illustrates another system and method of the invention in schematic block diagram fashion. The system and method illustrated in FIG. 4 is similar to that illustrated in FIG. 2, but includes certain features not present in the embodiment illustrated in FIG. 2. Rather than a single tracking point and a single pre-plot tracking point, the embodiment of FIG. 4 includes three pre-plot track set points 1a, 1b, and 1c. Pre-plot set point 1a may be for center of source, CS; pre-plot set point 1b may be for streamer front end center, SFC; and pre-plot set point 1c may be for an imaginary tracking point, TP. Other pre-plot set points may be used. Also included in this embodiment are three PID controllers 10a, 10b, and 10c, one each for calculating respective residual differences 5a, 5b, and 5c between respective set points 1a, 1b, and 1c and 3D coordinate position measurements 3a, 3b, and 3c for CS, SFC, and TP, and generating preliminary command set points 7a, 7b, and 7c, respectively. A switch SW, which may be automatically programmed, or periodically switched by a human operator, selects which preliminary command set point to use as the set point 7 for tracking control device 8. As an example, switch SW might be programmed to compare preliminary set points 7a, 7b, and 7c to select the largest of the residuals to use. Although the expense of this system may be greater than the embodiment illustrated in FIG. 2 due to the provision of three PID (or other type) controllers and a switching device, the ability to use the greatest residual, or some other residual, may provide higher quality control. Mono-variable or multivariable model predictive controllers could substitute for one or more of the PID controllers in these embodiments.

Figure 5:
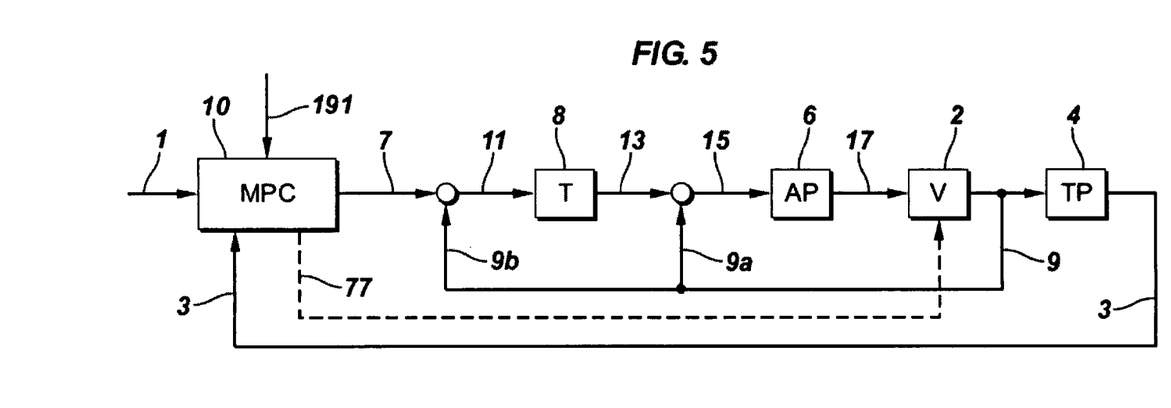
Figure 6:
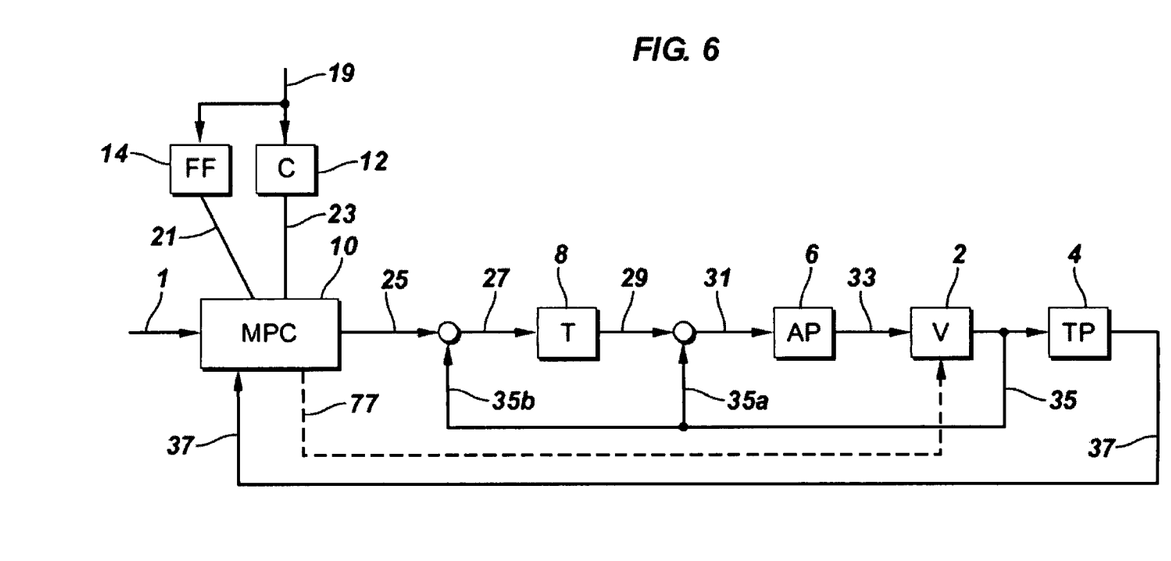

FIGS. 5 and 6 illustrate use of Model Predictive (MP) controllers rather than PID controllers. The characteristics of each are discussed herein below. The embodiments illustrated in FIG. 5 are similar to those discussed in relation to FIG. 2 except for the use of MP controllers, which may be mono-variable or multivariable MP controllers. The main components include the vessel 2, a tracking point 4, in a block labeled TP which may be an imaginary point anywhere in the spread, such as between the center of source and streamer front end center, or may be the center of source itself. Also illustrated are blocks 6 for an autopilot AP, a block 8 designating a tracking control device T, and MP controller 10. MP controller 10 compares a set point pre-plot position 1 of tracking point 4 with a measured 3D coordinate position 3 of tracking point 4, and uses a pre-existing mathematical model of the system in conjunction with measured disturbances 191 on the system, such as wind, currents, and the like, and calculates a residual and generates a command 7 as a set point track to tracking control device 8. As with the embodiments described in reference to FIG. 2, it will be understood that certain embodiments will send command 7 directly to the autopilot, bypassing the tracking device, or bypass both the tracking device and autopilot, and directly command the vessel rudder and/or vessel thruster, as indicated by the dashed line 77. In one embodiment of FIG. 5, tracking control device 8 compares this new set point track 7 to a measured track 9b of vessel 2 and computes a difference 11, and uses difference 11 in generating a set point heading 13 for use by autopilot 6. Autopilot 6 compares set point heading 13 with a measured heading 9a of vessel 2, computes a difference as 15, and uses difference 15 to generate a steering set point 17 for vessel 2, which is transmitted to a vessel rudder and/or thruster. Steering of vessel 2 will then influence the tracking point 4 position in a more controlled and stable fashion using a tuned controller, rather than a human operator. In one alternative embodiment, indicated by dashed line 77, steering set point 17 is replaced directly by set point indicated by dashed line 77.

The embodiments illustrated in FIG. 6 are similar to those discussed in relation to FIG. 3 except for the use of MP controllers, which may be mono-variable or multivariable MP controllers. MP controller 10 compares a pre-plot position 1 of tracking point 4 with a measured 3D coordinate position 37 of tracking point 4, and calculates a residual 5, and generates a command 7 as a set point track to tracking control device 8. Added in this embodiment is a modification of the set point signal 7 by a feed-forward controller 12 in block C, which may optionally feed historical, real time or near-real time, or future predictions of data 19 regarding current and/or wind as a modification to set point 7. Also depicted is a block denoted FF, which may optionally feed forward historical information 19 regarding wind, current, and other environmental conditions, or information regarding obstructions in the designated survey area, and the like. In one embodiment of FIG. 6, a modified set point track 25 is compared with a measured track 35b of vessel 2 and computes a difference 27, and uses difference 27 in generating a set point heading 29 for use by autopilot 6. Autopilot 6 compares set point heading 29 with a measured heading 35a of vessel 2, computes a difference as 31, and uses difference 31 to generate a steering set point 33 for vessel 2. Alternatively, rather than comparing set point 25 with measured track 35b, set point 77 is sent directly to vessel 2 for changing a vessel rudder, thruster, or both. In either embodiment of FIG. 6, steering of vessel 2 will then influence the tracking point 4 position in a more controlled and stable fashion using an MP controller and feed-forward controller, rather than an MP controller alone, or a human operator.

As should now be evident, using the systems and methods of the invention the operator does not have to perform manual control, and this may result in:

- an objective reaction not dependent on operator skill level and alertness;
- control reaction with little or no delay;
- proactive response to current and other environmental factors with feed forward options; and
- more frequent update rates.

The apparatus of the invention may be used in conjunction with conventional spread control devices. These devices include source steering devices and streamer steering devices. Such devices are often part of the spread and towed by the vessel.

For example, the source reference point must be within 10 meters cross line of the target in order for a source steering device with an ability to move the source 10 meters crossline to move the source reference closer to the target.

Controllers useful in the systems and methods of the invention may vary in their details. One PID controller useful in the invention may be expressed mathematically as in Equation 1:

$$u(t)=K_p[e(t)+1/Ti\cdot\int e(t)dt+T_d\dot{e}(t)] \quad (1)$$

wherein:

$\int$ means integrate;

$\dot{e}(t)$ means the time derivative;

u(t) is controller output, either meters across to a tracking control device such as that known under the trade designation Robtrack/STS500, or heading to an autopilot;

e(t) means difference between wanted (planned, reference) and measured (current position, y) value;

$T_d$ is a constant for describing the derivative part of the algorithm (the derivative part may be filtered to avoid deriving high frequencies);

Ti is a constant for describing the integrating part of the algorithm; and $K_p$ is a proportional gain constant.

In the s-plane (Laplace), the PID controller may be expressed as (Equation 2):

$$Hr(s)=K_p[1+1/Tis+Tds/(1+Tfs)] \quad (2)$$

wherein:

s is the variable in the s-plane; and

Tf is a constant describing the filtering part of the derivative part of the algorithm.

For discretization, a variety of transforms may be employed, and some constants may or may not be useful. For example, the $T_f$ constant may not be necessary in some instances, but may be especially useful in other scenarios. As one discretization example, the z-transform may be used, meaning that the integral part of the algorithm may be approximated by using a trapezoid model of the form (Equation 3):

$$s=(1-z-1)/T \quad (3)$$

while the derivative part may be approximated using an Euler model (Equation 4):

$$s=2/T\cdot(1-z-1)/(1+z-1) \quad (4)$$

wherein T is the sampling time.

The resulting discrete model may then be used directly in the steering algorithm. Other discrete models, derived using other transforms, are useful in the invention, and will be apparent to control technicians or control engineers of ordinary skill.

Model Predictive Control (MPC) is an advanced multivariable control method for use in multiple input/multiple output (MIMO) systems. An overview of industrial Model Predictive Control can be found at: www.che.utexas.edu/~qin/cpcv/cpcv14.html. MPC computes a sequence of manipulated variable adjustments in order to optimise the future behavior of the process in question. At each control time k, MPC solves a dynamic optimization problem using a model of the controlled system, so as to optimize future behavior (at time k+1, k+2 . . . k+n) over a prediction horizon n. This is again performed at time k+1, k+2 . . . . MPC may use any derived objective function, such as Quadratic Performance Objective, and the like, including weighting functions of manipulated variables and measurements. Dynamics of the process and/or system to be controlled are described in an explicit model of the process and/or system, which may be obtained for example by mathematical modeling, or estimated from test data of the real process and/or system. Some techniques to determine some of the dynamics of the system and/or process to be controlled include step response models, impulse response models, and other linear or non-linear models. Often an accurate model is not necessary. Input and output constraints may be included in the problem formulation so that future constraint violations are anticipated and prevented, such as hard constraints, soft constraints, set point constraints, funnel constraints, return on capital constraints, and the like. It may be difficult to explicitly state stability of an MPC control scheme, and in certain embodiments of the present invention it may be necessary to use nonlinear MPC. IN so-called advance spread control of marine seismic spreads, PID control may be used on strong mono-variable loops with few or nonproblematic interactions, while one or more networks of MPC might be used, or other multivariable control structures, for strong interconnected loops. Furthermore, computing time considerations may be a limiting factor. Some embodiments may employ nonlinear MPC.

The feed forward algorithm, if used, will in the most general sense be task specific, meaning that it will be specially designed to the task it is designed to solve. This specific design might be difficult to design, but a lot is gained by using a more general algorithm, such as a first or second order filter with a given gain and time constants.

The introduction of a tracking point may serve at least two purposes:
1. It gives a more flexible solution for a track that we want parts of the spread to follow;
2. If other means are used for controlling source positions, like a winch or a source deflector, the vessel will in many occasions have "spare" steering capacity available. This may mean that by moving the tracking point aft of the sources, streamer front ends and consequentially also the receivers may be closer to where they should be, which may help the streamer steering devices, such as those known under the trade designation Q-FIN, available from WesternGeco, LLC, Houston, Tex., in achieving their steering objectives.

In certain embodiments of the invention the tracking point will not be a static point in the spread, as time varying currents may result in the center of source steering objective and the tracking point steering objective unable to be met at the same time. In these embodiments, the tracking point may be moved, either dynamically or non-dynamically, until both objectives can be met with a certain slack. The reverse might also be the case, i.e. having excess steering power resulting in moving the tracking point further aft. If the movement of the tracking point is above a predefined distance, a new set of parameters for both the controller and the feed forward controller may be used to optimize the controller performance.

The systems and methods of the invention may be used in many spread embodiments. For example, for obtaining deghosted seismic data, it may be possible to provide one or more seismic streamers with a companion seismic streamer where the companions are towed in over/under fashion. The vertical distance between seismic streamers in an over/under seismic streamer pair may range from 1 meter to 50 meters, and may be about 5 meters. A selected number of hydrophones, either mounted within the seismic streamer or in/on equipment mounted onto the seismic streamer, may be used as receivers in an acoustic ranging system and thereby provide knowledge of the horizontal and vertical position of seismic streamers.

In use, systems and methods of the invention are particularly adept for 3D and so-called 4D marine seismic data acquisition surveys, and may be used in positioning seabed seismic cables as well. More specifically, the systems and methods of the invention may be integrated into the seismic towing vessel steering strategy, and may be integrated into positioning strategies for the other spread elements. In time-lapse or so-called 4D seismic, the source and receivers may be positioned to within a few meters of a baseline survey in order to gather a good picture of the evolution of a reservoir over time. The geophysical requirement for the accuracy of the repositioning varies with the geological structure and the expected time-difference signal, but generally a 10 meter positioning discrepancy is allowed, and often a bigger mismatch is allowed due to practicalities regarding the historical repositioning abilities. It is desired to position the source to within 5 meters, and the streamers to within about 10 meters of their previous tracks. Computing a residual difference between the 3D coordinate position and a pre-plot 3D coordinate position of the tracking point may be helpful in order to meet these targets as it allows for corrective actions to be taken before it is too late. One use of systems and methods of the invention is to make approximate positioning by seismic towing vessel steering and to fine tune by positioning the individual spread elements behind the seismic towing vessel, i.e. the source and the streamers, if present. One optional strategy involves automatic control of vessel steering combined with open loop control of the individual steering elements. Automatic vessel steering should minimize the repositioning error.

Systems and methods of the invention may employ any number of spread control elements, which may include one or more orientation members, a device capable of movements that may result in any one or multiple straight line or curved path movements of a spread element in 3-dimensions, such as lateral, vertical up, vertical down, horizontal, and combinations thereof. The terms and phrases "bird", "cable controller", "streamer control device", and like terms and phrases are used interchangeably herein and refer to orientation members having one or more control surfaces attached thereto or a part thereof. A "steerable front-end deflector" (or simply "deflector") such as typically positioned at the front end of selected streamers, and other deflecting members, such as those that may be employed at the front end of seismic sources or source arrays, may function as orientation members in some embodiments, although they are primarily used to pull streamers and steer sources laterally with respect to direction of movement of a tow vessel. Horizontal separation between individual streamers may range from 10 to about 200 meters. In the embodiment of FIG. 1 the horizontal streamer separation may be consistent between one streamer and its nearest neighboring streamers. Horizontal and/or vertical control of streamers may be provided by orientation members (not illustrated) which may be of any type as explained herein, such as small hydrofoils or steerable birds that can provide forces in the vertical and/or horizontal planes. One suitable orientation member is the device known under the trade designation Q-FIN™, available from WesternGeco LLC, Houston, Tex., and described in U.S. Pat. No. 6,671,223, describing a steerable bird that is designed to be electrically and mechanically connected in series with a streamer; another suitable device is that known under the trade designation DigiBIRD™, available from Input/Output, Inc., Stafford, Tex. Other streamer positioning devices, such as the devices described in U.S. Pat. Nos. 3,774,570; 3,560,912; 5,443,027; 3,605,674; 4,404,664; 6,525,992 and EP patent publication no. EP 0613025, may be employed.

Systems of the invention may communicate with the outside world, for example another vessel or vehicle, a satellite, a hand-held device, a land-based device, and the like. The way this may be accomplished varies in accordance with the amount of energy the system requires and the amount of energy the system is able to store locally in terms of batteries, fuel cells, and the like. Batteries, fuel cells, and the like may be employed, and wireless communication may be sufficient. Alternatively, or in addition, there may be a hard-wire power connection and a hard wire communications connection to another device, this other device able to communicate via wireless transmission.

Certain systems and methods of the invention may work in feed-forwarded fashion with existing control apparatus and methods to position not only the seismic tow vessel, but seismic sources and streamers. Sources and streamers may be actively controlled by using GPS data or other position detector sensing the position of the streamer (e.g. underwater acoustic network), or other means may sense the orientation of one or more individual streamers (e.g. compass) and feed this data to navigation and control systems. While gross positioning and local movement of tracking point, center of source and/or streamer front end center may be controlled via controlling the tow vessel, fine control may be accomplished on some other vessel, locally, or indeed a remote location. By using a communication system, either hardwire or wireless, environmental information ahead of the vessel may be sent to one or more local controllers, as well as the controller for the vessel. The local controllers may in turn be operatively connected to spread control elements comprising motors or other motive power means, and actuators and couplers connected to the orientation members (flaps), and, if present, steerable birds, which function to move the spread components as desired. This in turn adjusts the position of the spread element, causing it to move as desired. Feedback control may be achieved using local sensors positioned as appropriate depending on the specific embodiment used, which may inform the local and remote controllers of the position of one or more orientation members, distance between streamers, a position of an actuator, the status of a motor or hydraulic cylinder, the status of a steerable bird, and the like. A computer or human operator can thus access information and control the entire positioning effort, and thus obtain much better control over the seismic data acquisition process.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. §112, paragraph 6 unless "means for" is explicitly recited together with an associated function. "Means for" clauses are intended to cover the structures described herein as performing the recited function and not only structural equivalents, but also equivalent structures. Thus, although electronic and hydraulic motion platforms may not be structural equivalents in that an electronic motion platform employs one type of actuator, whereas a hydraulic motion platform employs a different type of actuator, in the environment of motion platforms for motion compensation, electronic and hydraulic motion platforms may be equivalent structures.

What is claimed is:

1. A system comprising:
   a marine seismic spread comprising a towing vessel and a seismic spread element towed by the vessel, the seismic spread element comprising a steering mechanism; and
   a control subsystem adapted to determine a first difference between a tracking point of the seismic spread and a position from a pre-determined path, determine a new track based on the first difference, determine a second difference between the new track and a measured track, and selectively steer the vessel and the steering mechanism of the seismic spread element based at least in part on the second difference.

2. The system of claim 1, wherein the control subsystem is adapted to selectively steer the steering mechanism of the seismic spread element in a lateral direction relative to a direction in which the towing vessel tows the seismic spread element.

3. The system of claim 2, wherein the steering mechanism comprises a steerable bird.

4. The system of claim 1, wherein the seismic spread element comprises a streamer or a seismic source.

5. The system of claim 1, wherein the control subsystem is adapted to steer the vessel to coarsely position the tracking point with respect to the path and steer the steering mechanism of the seismic spread element to finely tune the tracking point with respect to the predetermined path.

6. The system of claim 1, wherein the control subsystem comprises an autopilot adapted to steer the vessel and a tracking control device adapted to provide a set point vessel position and heading to the autopilot.

7. The system of claim 1, further comprising:
   wherein the control subsystem is operatively connected to one or more sensors for measuring the position of the tracking point.

8. The system of claim 1, wherein the towing vessel comprises one or more current measuring devices, and the control subsystem further bases the steering of the vessel and the steering mechanism on at least one measurement provided by said at least one or more current measuring devices.

9. The system of claim 1, wherein the control subsystem further bases the steering of the vessel and the steering mechanism on one or more of the following control techniques: feed forward, cascade, internal feedback, model predictive, neural networks and Kalman filtering.

10. The system of claim 1, wherein the control subsystem comprises at least one PID controller.

11. A method comprising:
    using at least one towing vessel to tow a seismic spread element;
    determining a first difference between a tracking position of the seismic spread and a position along a predetermined path;
    based at least in part on the first difference, determining a new track for the seismic spread element;
    determining a second difference between the new track and a measured track of the seismic spread element; and selectively steering the vessel and selectively steering a steering mechanism of the seismic spread element based at least in part on the second difference.

12. The method of claim 11, wherein the act of steering comprises steering a streamer positioning device.

13. The method of claim 11, wherein the seismic spread element comprises a streamer or a seismic source.

14. The method of claim 11, wherein the act of selectively steering comprises:
coarsely positioning the tracking point with respect to the path, comprising steering the vessel; and
finely positioning the tracking point with respect to the path, comprising steering the steering mechanism of the seismic spread element.

15. The method of claim 11,
wherein the seismic spread element further comprises at least one seismic receiver and seismic source; and
wherein the act of steering the steering mechanism of the seismic spread element further comprises positioning the seismic receiver and the seismic source independently to respective paths.

16. The method of claim 11, wherein the act of steering the steering mechanism of the seismic spread element comprises laterally steering the steering mechanism relative to a direction in which said at least one towing vessel tows the seismic spread element.

17. The method of claim 11, further comprising:
further basing the steering on measurements of the position of the tracking point.

18. The method of claim 11, further comprising:
further basing the steering on a measurement provided by a current measuring device.

* * * * *